Fig. 1a

United States Patent Office 3,129,344
Patented Apr. 14, 1964

3,129,344
SWITCHING CIRCUIT EMPLOYING BISTABLE DEVICES TO SELECTIVELY CONTROL THE CHARGE TIME FOR SWITCHING
John W. Lemon, Jr., Berkley, Mich., assignor to Robotron Corporation, Detroit, Mich., a corporation of Michigan
Filed Apr. 11, 1962, Ser. No. 187,165
12 Claims. (Cl. 307—88.5)

This invention relates to a sequence timer and particularly to one wherein all of the timing functions are performed under the control of solid state components.

While this invention has arisen out of the resistance welding field, and the embodiment herein shown for illustrating same is for convenience a timer utilized that this is for illustrative purposes only and is not limiting.

In the resistance welding field, as well as in many similar fields, the problem of maintenance is often a prime consideration in the selection of sequence timers. While the actual cost of maintenance itself may in many cases be minor, where a timer fails for even a short time the lost production of the machine thus incapacitated will usually be very great. Accordingly, suppliers of sequence timers have from the beginning expended great efforts to provide timers having a minimum of maintenance problems.

With the advent of solid state components, such as transistors, it has been recognized in many industries that these components provide many advantages in various kinds of electronic equipment. These advantages are well known and consist primarily in, or are derived from, the small size, light weight, and durability of these components. However, transistors are not capable of carrying the currents that were normally utilized for operating the relays used in resistance welding timers and, accordingly, for this and other reasons, previous efforts to apply transistors to sequence timers for resistance welding machines have been somewhat less than satisfactory.

Accordingly, the objects of the invention are:

(1) To provide a sequence timer for the handling of relatively heavy loads, such as are utilized in electrical welding operations, which timer utilizes solely solid state components for controlling the performance of the timing functions.

(2) To provide a sequence timer, as aforesaid, which will handle the currents necessary for operating the load relays but which will do so without the necessity of using gas-filled or similar devices.

(3) To provide an electrical timer, as aforesaid, which will be reliable and capable of long functioning accurately and effectively and with low maintenance requirements.

(4) To provide a timer, as aforesaid, wherein all of the timing circuit components other than a load relay and an initiating switch may be encapsulated.

(5) To provide a sequence timer, as aforesaid, which, while designed primarily for controlling resistance welding operations, is also applicable to a variety of other sequencing functions.

(6) To provide a sequence timer, as aforesaid, wherein the number of timing functions obtained can be readily increased from a basic unit by a relatively simple multiplication of certain of the operating parts.

(7) To provide a sequence timer, as aforesaid, wherein the duration of each of the timed functions may be readily varied.

(8) To provide a sequence timer, as aforesaid, which can be manufactured at an acceptable cost.

Other objects and purposes of the invention will be apparent to persons acquainted with devices of this type upon a reading of the following disclosure and inspection of the accompanying drawings.

In the drawings:

FIGURE 4 is a schematic diagram showing a modification of the circuit shown in FIGURE 1a.

GENERAL DESCRIPTION

In general, my invention comprises one or more bi-stable circuits, each having parts which may be designated as "A" and "B" and which are related to each other to determine the conductivities of the four circuits of the timing sequence. For example, taking a case where two such circuits are used: (a) when the parts "A" of the two bi-stable circuits are conducting, a first timed function is effected; (b) when part "A" of the first and part "B" of the second bi-stable circuit are conducting, a second timed function is effected; (c) when part "B" of the first and part "A" of the second bi-stable circuit are conducting, a third timed function is effected, and (d) when part "B" of the first and part "B" of the second bi-stable circuit are conducting, a fourth timed function is effected. Activation of said predetermined parts of said bi-stable circuits also effects the energization of suitable load controlling devices.

DETAILED DESCRIPTION

Referring now to the drawings, there is provided a pair of input terminals 1 and 2 connectible to a suitable source of alternating potential. Said terminals are connected to the primary winding of a transformer 3 which transformer has a plurality of secondary windings indicated at 4, 5, 6 and 60. The secondary winding 4 provides at terminals 7 and 8 an alternating potential of suitable voltage which in this particular embodiment is 24 volts. The secondary winding 5 is provided with current rectifying means of any suitable type, here an ordinary transformer center tap 9, rectifiers 11 and 12 and a capacitor 13 for providing a constant voltage between terminals 14 and 8. In this embodiment, said voltage is 25 volts positive at terminal 14 with respect to terminal 8. The secondary winding 6 is likewise provided with a suitable current rectifying circuit here consisting of a transformer center tap 17, rectifiers 18 and 19 and a capacitor 21 for providing a constant voltage between terminals 22 and 8. Here the voltage at 22 is 8 volts negative with respect to that at terminal 8.

Lastly, the secondary winding 60 and associated rectifying circuit 50 supply a further D.C. voltage which is added to the voltage between the points 14 and 8 to provide a potential which is 35 volts positive at the point 55 with respect to that at point 8.

Extending from the several terminals 7, 8, 14 and 22 are suitable bus conductors 23, 24 26 and 27, respectively, between which the several parts of the subsequently described circuit are connected. Following the exemplary values above mentioned, there will accordingly, be a D.C. potential of 25 volts positive on the positive D.C. conductor 26 with respect to the common conductor 24, a voltage of 8 volts negative on the negative D.C. conductor 27 with respect to the common conductor 24 and there will be an alternating voltage of 24 volts R.M.S. between the conductor 23 and the common conductor 24.

A first bi-stable circuit is provided and this includes the transistors 31 and 32. A junction point 33 on the conductor 26 is connected through a resistor 34 of relatively low value to a junction point 36. This latter junction point is connected to the collector of transistor 31 which transistor is then connected through its emitter to a junction point 37 and thence through a resistor 38 of low value to junction point 39 on the common bus conductor 24. The junction point 36 is also connected through a capacitor 41 and a resistor 42, themselves connected in parallel circuit with respect to each other, to a junction point 43.

A junction point 44 on the positive D.C. conductor 26 is connected through a resistor 46 of value preferably equal to that of resistor 34 to a junction point 47, which junction point is connected to the collector of the transistor 32 whose emitter is connected to the junction point 37. The junction point 47 is also connected through a capacitor 48 and a resistor 49, said capacitor and resistor being connected in parallel circuit with respect to each other, to a junction point 51. The junction point 51 is connected to the base of the transistor 31 and also to a junction point 52. Said last-named junction point is connected through a resistor 53 of relatively high value to the common conductor 24. The junction point 43 is connected to the base of transistor 32 and is also connected through a resistor 54 of relatively high value, preferably equal to that of resistor 53, to the common conductor 24.

The second bi-stable circuit is provided with the transistors 61 and 62. A junction point 63 on the conductor 26 is connected through a resistor 64 of relatively low value to a junction point 66. This latter junction point is connected to the collector of transistor 61 which transistor is then connected through its emitter to a junction point 67 and thence through a resistor 68 of relatively low value to junction point 69 on the common bus conductor 24. The junction point 66 is also connected through a capacitor 71 and a resistor 72, themselves connected in parallel circuit with respect to each other, to a junction point 73.

A junction point 74 on the positive bus conductor 26 is connected through a resistor 76 of value preferably equal to that of resistor 64 to a junction point 77, which junction point is connected to the collector of the transistor 62 whose emitter is connected to the junction point 67. The junction point 77 is also connected through a capacitor 78 and a resistor 79, said capacitor and resistor being connected in parallel circuit with respect to each other, to a junction point 81. The junction point 81 is connected to the base of the transistor 61 and also through a resistor 83 of relatively high value to the common line 24. Junction point 73 is connected to the base of transistor 62 and is also connected through a resistor 84 of relatively high value, preferably equal to that of resistor 83, to the common conductor 24.

The trigger pulses for said bi-stable circuits are provided by a valve circuit capable of becoming conductive in response to an external signal. In this embodiment such circuit utilizes a uni-junction transistor 91, said uni-junction transistor having the familiar characteristic of being normally resistive to current passage between its principal terminals but becoming suddenly conductive between said terminals upon the appearance of a predetermined voltage at a control terminal. The terminal 55 in the rectifier circuit 50 is connected through resistors 40 and 35 to a junction ponit 94. Said junction point 94 is connected to the second base $B_2$ of the uni-junction transistor and the first base $B_1$ is connected to a junction point 96 on the common conductor 24. The emitter 100 of the uni-junction is connected through a resistor 97 of a relatively low value to one side of a capacitor 98 whose other side is connected to a junction point 99 on the common conductor 24.

The contacts 101 of a normally open emergency stop switch are connected in series through a resistor 105 around the capacitor 98. Another set of normally opened contacts 102, operable simultaneously with the contacts 101, includes a contact connected through a resistor 110 to a junction point 103 on the positive D.C. conductor 26, and a second contact connected through a rectifier 104 to the junction point 52 and also through a further rectifier 106 to the junction point 82. Both of said rectifiers are polarized with their cathodes connected to the junction points 52 and 82, respectively. These reset the bi-stable circuit to the "at rest" condition when the emergency stop is actuated.

Turning now to the charging circuit for said capacitor 98, a conductor 107 is connected to a point between the capacitor 98 and the resistance 97 and connects to a further conductor 108. Said last-named conductor connects through a rectifier 111 to one side of a rheostat 112. Said rectifier is polarized with its cathode connected to the conductor 108. The other side of said rheostat 112 is connected by a conductor 113, (a) through series connected resistors 147 and 148, together totaling a relatively high value, to the positive D.C. conductor 26, (b) through a rectifier 116, to a conductor 117 and thence to a junction point 118 which junction point is connected to the junction point 47, and (c) through a rectifier 119 and a conductor 121 to the junction point 66. Both of said two last-named rectifiers 116 and 119 are polarized with their cathodes connected to the points 47 and 66, respectively.

The conductor 108 is also connected through a rectifier 122, which is polarized so that its cathode is connected to the conductor 108, thence through a rheostat 123 and a conductor 124 (a) through a resistance 126 of relatively high value, preferably a value equal to that of a resistance 147, to the positive D.C. conductor 26, (b) to a conductor 127, a rectifier 128 and line 129 to a junction point 131 which junction point in turn is connected to the junction point 36, and (c) through a rectifier 132 to a conductor 133 which is connected to the junction point 77. Both of said two last-named rectifiers 128 and 132 are polarized with their cathodes connected to said junction points 131 and 77, respectively.

The conductor 108 is also connected through a rectifier 134, which rectifier is polarized so that its cathode is connected to the line 108, through a rheostat 136 and the conductor 137 (a) through a resistance 138 of relatively high value, said value being equal to that of resistance 147, to the positive D.C. conductor 26, (b) through a rectifier 139 to the above-mentioned conductor 117, and (c) through a rectifier 141 to the conductor 133. Both of said two last-named rectifiers 139 and 141 are polarized so that their cathodes are connected to the lines 117 and 133, respectively.

The line 108 is further connected by the conductor 142 through a rectifier 114 to junction point 143 and thence to one side of rheostat 144. The other side of said rheostat is connected through a first contact 145 of a switch 146 to the conductor 155 which in turn is connected (a) through a rectifier 149 to the conductor 129, (b) through the resistances 151 and 150 (which are preferably equal in value to the resistances 147 and 148, respectively) to the positive D.C. potential conductor 26, and (c) through the rectifier 120 to the line 121. The rectifiers 149 and 120 are respectively polarized with their anodes connected to the line 155. A further conductor connects the junction point 143 to a second contact 153 of the switch 146.

Sensing connections are provided for operation with the circuitry thus far described by which the varying voltages developed in the bistable circuits are interpreted and supplied as control voltages to the valve circuits hereinafter further described. One such connection is taken at the junction point 94 through a capacitor 117 and conductor 166 to a junction point 164, thence to the cathode side of a rectifier 163 whose anode side connects to a junction point 162 which is connected by conductor 161 to junction point 131. The signal from point 94 is further taken from the junction point 164 by a conductor 172 which connects to the cathode side of a rectifier 171 whose anode side is connected to a junction point 165 and thence by a conductor 160 to the junction point 118. A conductor connects from the junction point 162 to the cathode side of the rectifier 167 whose anode side is connected to conductor 168 which connects through a junction point 169 to the base of a transistor 170 (FIGURE 1b). The base of transistor 170 is also connected through a resistance 188 to the conductor 26.

Similarly a conductor 175 connects the junction point 77 to a junction point 173 which in turn is connected to the cathode side of a rectifier 174 whose anode is connected to the junction point 169. Thus, signals appearing in either of the junction points 162 or 173 will be applied to the base of transistor 170.

Further, the junction point 173 is connected to the anode side of the rectifier 176 whose cathode side is connected to a conductor 177. Similarly, the junction point 165 is also connected to the anode side of rectifier 178 whose cathode side is connected to the conductor 177. Said conductor 177 is then connected to the base of a transistor 181. The collector of transistor 181 is connected by a conductor 182 to the positive D.C. conductor 26 and the emitter of said transistor is connected through a resistance 183 to and through a junction point 184 and thence through another resistance 186 to the negative D.C. conductor 27.

The positive D.C. conductor 26 and the negative conductor 27 are further connected by a conductor 187 which connects through the collector of the transistor 170 whose emitter is connected through a further resistance 189 to and through a junction point 191 and finally through a resistance 192 to the conductor 27.

While the precise values of the resistances 188, 189 and 192 will be chosen according to specific design requirements, their ratio should be such that the point 191 may vary from a small negative value to a positive potential throughout all of the operation of the apparatus. In one specific embodiment the resistance 188 is 5100 ohms, the resistance 189 is 2700 ohms and the resistance 192 is 6800 ohms. This permits the base of transistor 170 to vary from three volts to fifteen volts and the point 191 to vary from a small negative potential to a positive potential of approximately one volt as limited by the gate conduction of the silicon-controlled rectifiers 224 and 225 hereinafter further described.

The load circuits which are to be controlled by the sequence timer of the present invention constitute in this embodiment a relay winding 201 and the primary winding of a transformer 203. One side of the relay winding 201 is connected by conductor 204 to the alternating conductor 23. The other side of said relay winding 201 is connected to the anode side of a controlled rectifier 207 whose cathode side is connected to the anode side of a rectifier 202, whose cathode is in turn connected through a junction point 208 to the contacts 209 of said relay and thence to a junction point 211 on the common conductor 24. A further conductor 212 including normally open pilot switch 217 is connected around the contacts 209.

A conductor 214 connects the junction point 184 to the control electrode of said controlled rectifier 207.

A suitable resistance 219 may be connected around the relay windings 201.

The contacts S of the relay are connected for controlling the energization of the solenoid valve for supplying fluid pressure to urge the welding electrodes toward each other. The contacts S are opened and closed simultaneously with contacts 209.

When switch 217 or contacts 209 are closed, a conductor 212 is further connected to the cathode of a rectifier 218 whose anode is onnected by a conductor 210 to one side of a switch 146a whose other side is connected to and through a conductor 179 to a point 152 (FIGURE 1a) located between the resistances 150 and 151. The conductor 212 is also connected to the cathode of a rectifier 221 whose anode is connected by a conductor 205 to a line 206 which is connected at its one end through a resistance 125 to the positive D.C. line 26 and at its other end through a resistance 190 to the junction point 200 and hence through a resistance 195 to the negative D.C. potential line 27. The values of said resistance 125, 190 and 195 are chosen to hold the junction point 200 and the base of transistor 265 connected thereto normally positive when contacts 209 or switch 217 are open and slightly negative when the aforementioned contacts or switches are closed. In this embodiment said values are 5600 ohms, 3300 ohms and 5600 ohms, respectively.

The transistor 265 above mentioned has its emitter connected to the junction point 215 on the line 24 and its collector is connected by a line 250 to a point 140 (FIGURE 1a) located between the resistances 147 and 148.

A second load comprises the primary winding of the transformer 203 and is in this instance designed for energizing the firing thyratrons of the resistance welding system. Here suitable junction points on the common conductor 24 are connected by lines 222 and 223 to the cathodes, respectively, of silicon-controlled rectifiers 224 and 225 and their anodes are respectively connected to the junction points 226 and 227. The junction point 191 is connected through suitable resistances 228 and 229 to the respective control electrodes of said silicon-controlled rectifiers 224 and 225. A conductor 231 connects the common conductor 24 to a junction point which in turn is connected to the anodes of rectifiers 232 and 233 whose cathodes are respectively connected to the junction points 226 and 227. The junction point 226 is then connected to the center tap of the secondary winding 230 whose primary winding is energized independently if desired, or it may be a further secondary winding of the transformer 3. One end of the said secondary winding 230 is connected through a capacitor 235 and a junction point 240 to one end of the primary winding 203 whose other end is connected to the junction point 227. The other end of said secondary winding 230 is connected through a rheostat 245 to the junction point 240. Thus, the primary winding 203 is energized by a phase shift circuit of generally the nature shown in the patent of Stuart C. Rockafellow, No. 2,605,448. The amount of phase shift provided by such circuit is initially adjustable manually by the rheostat 245 and is further modified automatically by the conductivity of the rectifiers 224 and 225, the conductivity being modified by the potential appearing upon the control electrodes of rectifiers 224 and 225.

The junction point 47 (FIGURE 1a) is connected through a capacitor 251 to a junction point 252. Point 252 is in turn connected to point 66 through a rectifier 253 and is connected to point 77 by a conductor 254 having a rectifier 256 therein. A line including the resistor 255 connects the line 254 to the line 24.

The switches 146 and 146a are preferably mechanically connected for simultaneous operation as indicated by the broken line "M" extending therebetween.

OPERATION

Considering first the "at rest" condition, the point 200 is held somewhat positive (by the proper choice of values for the resistances 125, 190 and 195 as above set forth) which maintains the transistor 265 in conductive condition. This holds the junction point 140 intermediate resistances 147 and 148 at the potential of the common conductor 24 and thereby removes the charging potential from the line 113 and accordingly from the capacitor 98.

At the same time the open circuit in line 210 at the contacts 209 and at switch 217 isolates the point 152 from the common conductor 24 and accordingly the line 179 is subjected to the potential of the positive D.C. line 26. However, line 155 is prevented from rising to a high potential by the current path through rectifier 149, line 129, junction 131, junction 36, through transistor 31 (as hereinafter described), junction 37 and resistor 38 to line 24 thus bringing line 155 close to the potential of line 24.

The junction 162 is therefore at a low potential close to that of line 24 and may therefore provide a reduced potential through rectifier 167 and line 168 to the base of the transistor 170 insuring a reduced conducting state therein. Because transistor 170 is not conducting appreciably, the junction point 191 will be at a very low potential and will hold the gated rectifiers 224 and 225 nonconductive. Thus, no signal will appear in the load 203.

The first bi-stable circuit involving the transistors 31 and 32 will be conducting through the transistor 31 inasmuch as, for reasons appearing further hereinafter, this is the only stable condition in the "at rest" position of the operation. If the circuit, when power is applied, commences conduction through any other of the transistors, the circuit will go through a normal cycle until a single predetermined condition occurs, which conduction is at the beginning of a cycle and includes conduction through transistor 31. It will then stablize in such condition where the unit is used for welding timing. This condition is preferably the "squeeze" function.

More specifically, and since the point 47 is at a relatively high potential as developed further hereinafter, this will be applied to the base of the transistor 31 rendering same conductive. Such conduction of the transistor 31, and having in mind that the resistance 38 is appreciably less than the resistance 34, will lower the voltage at the point 36 to a value near that of the common conductor 24. The low voltage at the point 36 will be applied through the resistance 42 to the base of the transistor 32 rendering it substantially nonconductive and thereby holding the potential at the point 47 at a high level. The high potential at the point 66 will similarly render the transistor 62 conductive resulting in a low potential at the point 77 which in turn holds the transistor 61 substantially nonconductive. Thus, a stable condition is provided but one which can be upset in a manner usual to bi-stable circuits in a manner to be further described hereinafter. This stable condition maintains the lines 124, 137 and 155 at a very low potential through the respective rectifiers 128, 141 and 149 thus making it impossible for any of these three lines to charge the capacitor 98. Since the fourth line (113) is also maintained at a low potential through transistor 265 as described heretofore, no charging current is available to the capacitor 98.

The pulses from which said bi-stable circuits are caused to react are developed by the circuit including the uni-junction transistor 91. Assuming a relatively low charge on the capacitor 98, and a constant low voltage on the control terminal of the uni-junction 91, it will be seen that little or no current will pass therethrough. Thus, the D.C. voltage difference between the points 45 and 96 will be only slightly affected by a small bias current flowing through the base circuit and therefore the potential will be relatively high.

A positive potential is applied to the base of the transistor 181 from the point 44 on the positive D.C. conductor 26 acting through the junction points 47, 118, 165 and through the rectifier 178 and the line 177. In a preferred embodiment, the value of resistance 46 is only a small part of the value of the input resistance of the base circuit of transistor 181 and accordingly in a normal condition of the apparatus the base of said transistor 181 is held definitely positive and the transistor is accordingly conductive. The resistance 183 is proximately half the value of the resistance 186 which causes the point 184 also to be definitely positive while 181 conducts, and accordingly the controlled rectifier 207 is held normally conductive.

Therefore, upon the closing of the switch 217, the winding of the relay 201 is energized and this closes the contacts 209 whereupon said relay is locked in energized condition for so long as the controlled rectifier 207 remains conductive.

Referring now to the operation in more detail, we will continue to assume that the apparatus is being used to energize the usual four-step resistance welding operation consisting of the usual "squeeze," "weld," "hold" and "off," functions. However, it will be understood that such functions are referred to only for the purpose of illustration and that such reference is not limiting.

To commence operation of the apparatus, and with the switches 146a and 153 set as shown for "single" operation, the switch 217 is closed by any convenient means, such as manual, mechanical or electrical, which connects the conductor 206 to the common line 24. This brings the lines 205 and 210 to the potential of the common conductor 24 and also energizes the winding of the relay 201 immediately inasmuch as the controlled rectifier 207 is already conductive.

Diminishing the potential on the conductor 210 diminishes the potential on line 179 and thereby diminishes the potential at the junction point 152 between the resistors 150 and 151 with the result of diminishing the potential supplied to line 155. Diminishing the potential on the line 205 renders the transistor 265 nonconductive, or substantially nonconductive, which permits the potential at the point 140 between the resistors 147 and 148 to rise and thereby permits the potential on the line 113 to rise to a value capable of charging the timing capacitor 98.

*Squeeze Time*

With the line 113 at its high potential as above described, a charging path is provided for the capacitor 98 which commences with the positive D.C. conductor 26, goes through the resistances 148 and 147 to the line 113, then through the rheostat 112 and the rectifier 111 to the capacitor 98 and thence to the common line 24. Simultaneously, the line 113 is connected through the rectifier 116 to the point 47 and through the rectifier 119 to the point 66, both of which are at a high potential as above set forth, and maintained at such level by the nonconductivity of the transistors 32 and 61.

While the capacitor 98 is charging from line 113 and the transistor 62 is conductive, the high potential at the point 47 continues to pass current through the rectifier 178 and thereby hold the transistor 181 conductive which in turn continues to hold the controlled rectifier 207 conductive and the relay 201 energized. In the meantime, as in the "at rest" condition above described, the line 124 is connected through the rectifier 128 to the point 36 and thence through the conductive transistor 31 to the common line 24. This keeps the line 124 at or close to the potential of the common line 24, namely in this embodiment about 2.5 volts above line 24, and hence there is no charging path for the capacitor 98 provided through or from the line 124. Similarly, the line 137 is connected through the rectifier 141 to the junction point 77 and thence through the conductive transistor 62 and the junction point 67, to the common line 24. This holds the line 137 at or substantially at the voltage of the common line 24, about 2.5 volts above line 24, so that there is not provided any charging path from or through the line 137 to the capacitor 98. Likewise, the line 155 is connected through the rectifier 149 and the junction point 36 through the conductive transistor 31 to the common line 24 so that the line 155 is held close to the potential of the line 24 and there is no charging path provided from or through the line 155 to the capacitor 98.

Figure 2:
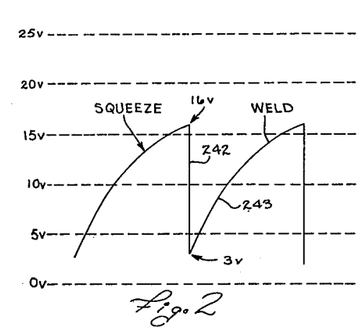
FIGURE 2 shows schematically the voltage appearing at a certain point in the circuit during normal operation thereof.
Figure 3:
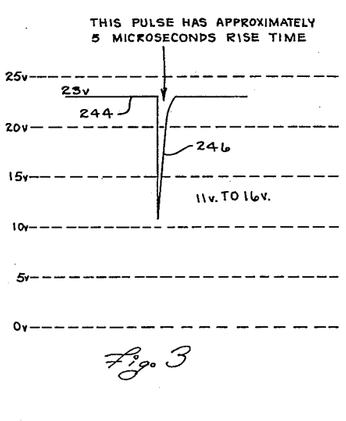
FIGURE 3 shows schematically the voltage appearing at another point in the circuit during normal operation thereof.

With the capacitor 98 now charging solely through the line 113, attention may be directed toward the operation of the triggering mechanism appearing near the left-hand end of the drawing. A D.C. potential originating from the rectifying unit 50 is applied through the resistances 40 and 35 and junction point 94, to the uni-junction transistor 91 and thence to the common conductor 24. So long as the uni-junction transistor 91 remains nonconductive, the potential of the junction point 94 will remain at a relatively high level as indicated by the line 244 in FIGURE 3. However, as the charge on the capacitor 98 increases, which rise is at a time rate determined by the setting of the rheostat 112 and is indicated by the line 241 in FIGURE 2, the potential of the electrode 100 of the uni-junction transistor 91 rises until said uni-junction transistor is rendered conductive. This occurs suddenly with two results, namely, (1) the capacitor 98 discharges through said uni-junction transistor in the manner illustrated by the line 242 of FIGURE 2, and (2) current flow occurs through the resistors 40 and 35 and through the uni-junction transistor 91 resulting in a substantial diminishing of the potential at the point 94. This provides the pulse 246 shown in FIGURE 3. Said conduction terminates as soon as the capacitor 98 has discharged below the predetermined potential whereupon the potential at the junction point 94 again rises as is also shown in FIGURE 3. Thus, there is provided a sharp negative pulse appearing at the junction point 94 which travels through the capacitor 117 and is applied by the lines 166 and 161 to the junction point 36 and by the line 172 to the junction point 47. The junction point 36 already being at a low potential, the arrival of the above-mentioned negative pulse at this point has essentially no effect upon it. However, the junction point 47 is at a high potential so that the arrival of a negative pulse at this point sharply diminishes said potential. In other words, the momentary conductivity of the uni-junction transistor 91 provides an alternate path for the high potential at the junction point 47 by which same may travel through the rectifier 171, the line 172, the line 166 to the junction point 94 and thence through the uni-junction transistor 91 to the common line 24. This sharply diminishes the potential at point 47.

In order to synchronize the pulse appearing at the junction point 94 with the A.C. potential supplied to the welding load, it is necessary to provide the further circuitry shown at the lefthand end of the drawing and including the transistor 15 and the circuitry associated therewith. This circuitry assures that the negative triggering pulse appearing at junction point 94 does so in a predetermined timed relationship to the wave form of the A.C. supply source provided by winding 4. The circuitry consists of a connection from the junction point 45 between the resistors 40 and 35 through a further resistor 10 to the collector and emitter of the transistor 15 to the common line 24. A rectifier 25 is connected from the common line 24 through a suitable limiting resistance to one side 7 of the alternating source provided by the secondary winding 4. The diode 25 is of the type which is nonconductive, or substantially so, until a reverse voltage of appreciable value is applied thereto, whereupon it changes from substantial nonconductivity to high conductivity with only a slight increase in the applied voltage. One such device is commonly known as a Zener diode. A capacitor 20 and a resistor 30 are connected around said diode 25 and a point between said capacitor and said resistor is connected to the base of the transistor 15.

With each cycle from the secondary winding 4 appearing at the diode 25, the same will conduct at a precisely predetermined voltage level and will apply a potential to the base of the transistor 15 and thereby render same conductive. This will lower the potential at the junction point 45 and thereby lower the potential applied to the uni-junction transistor 91. Lowering said latter potential will diminish the potential required at the electrode 100 to render same conductive and thus initiate the conductivity of the uni-junction transistor 91 at a precisely predetermined point on the supply wave.

When the potential at point 47 is sharply diminished by the negative pulse, a reversal of the conductive condition between the transistors 31 and 32 is brought about in a manner usual to bi-stable circuits. Briefly, the negative pulse appearing at 47 travels through the capacitor 48 to appear at the base of transistor 31 to render it nonconductive. This permits the potential at point 36 to rise which follows a bias path through resistor 42 to the base of transistor 32 for rendering it conductive.

Simultaneously, the negative pulse appearing at the junction point 47 is applied through the capacitor 251 and the rectifiers 253 and 256 to the junction points 66 and 77, or, otherwise stated, a high potential at either of the points 66 or 77 may be discharged through said rectifiers 253 and 256 and the capacitor 251 to and through the point 47 and thence through the uni-junction transistor 91 in the manner above described back to the common conductor 24. Since the point 77 is already at a low potential, no change occurs here. However, the point 66 is at a high potential so that this lowering thereof will effect a reversal of conductivity between the transistors 61 and 62 in a manner already set forth.

Therefore, as a result of the negative pulse appearing at the junction point 94, both of the bi-stable circuits have been reversed and the transistors 31 and 62 have been rendered nonconductive and the transistors 32 and 61 have become conductive. The apparatus is now entering its welding operation.

*Weld Time*

With the transistor 31 nonconductive, the voltage at point 36 rises to its high level; with the transistor 32 conductive the voltage at point 47 diminishes to its low value; with the transistor 61 conductive the voltage at point 66 is at its low level; and with the transistor 62 nonconductive the voltage at point 77 rises to its high level. This means that the voltage applied from the positive D.C. line 26 to the line 113 escapes through the junction point 66 and the transistor 61 to the common line 24 and hence the line 113 now falls to a low value and no charging of the timing capacitor 98 from said line 113 is possible. The voltage applied from the positive D.C. line 26 through the resistance 136 to the line 137 escapes through the rectifier 139 and junction point 47 through the conductive transistor 32 to the common line 24 and hence the potential on the line 137 is insufficient to charge the timing capacitor 98. Similarly the voltage applied from the positive D.C. line 26 through the resistances 150 and 151 to the line 155 escapes through the rectifier 120, junction point 66 and conductive transistor 61 to the common line 24 so that the potential on the line 155 is insufficient to charge the timing capacitor 98. However, the voltage applied from the positive D.C. line 26 through the resistance 126 to the line 124 has no such point of escape. Its connection through the rectifier 132 is to the junction point 77 which is now at a high potential and its connection through the rectifier 128 is to the junction point 36 which is also at a high potential. Therefore the line 124 remains at a high potential and current travels through the rheostat 123 and rectifier 122 to charge the timing capacitor 98.

While the capacitor 98 is so charging from the line 124, the high potential at the point 77 continues to pass current through the rectifier 176 and thereby hold the transistor 181 conductive which in turn continues to hold the control rectifier 207 conductive and the relay 201 energized.

At the same time the rise in potential at the point 36 effects a rise in potential at the point 162 which no longer provides a current path from line 26 through resistor 188 to line 168 through rectifier 167 to point 36. This creates a rise in potential on the base of the transistor 170 which makes said transistor more conductive and effects a current flow through the line 187 and the resistors 189 and 192 thereof. The resistor 189 being of appreciably less value than the resistor 192, this raises a potential of the point 191 from a slightly negative to a substantial positive value and applies said positive potential through resistors 228 and 229 to the control electrodes of the controlled rectifiers 224 and 225, respectively. This in effect reduces the resistance between the points 226 and 227 of the phase shift circuit including the primary winding 203 whereby to apply the phase shifted potential developed therein and initiate in a well-known manner an output in the primary winding of the transformer 203. With said transformer primary winding connected to any convenient firing circuit of a welding system, this will initiate the flow of welding current through the work.

The time required to charge said timing capacitor 98 is determined by the setting of the rheostat 123 and when the proper predetermined potential is reached at the uni-junction transistor's emitter 100, the negative pulse will again appear at the junction 94 in the manner above set forth and the weld time will come to an end.

With the appearance of the negative pulse at the junction point 94 same is again applied to the junction points 36 and 47 but this time the junction point 47 is already at a low level so that the negative pulse affects only the junction point 36. This lowers the potential at this point and again in a manner already recognized reverses the conductivity of the transistors 31 and 32 so that the transistor 31 now becomes conductive and the transistor 32 is nonconductive. The negative pulse appearing at point 94 is not provided a path to junction point 47 for the reasons following. Capacitor 117 was charged with a relatively high positive potential approaching that of line 26 through the path including line 26, the junction point 33, resistor 34, junction point 36, junction point 131, line 161, junction point 162, diode 163, junction point 164 and line 166. The positive voltage is applied to the cathode of rectifier 171 through line 172 resulting in no current flowing therethrough. As point 94 changes from 7 to 12 volts (depending essentially on the individual characteristics of the uni-junction transistor) of potential in a negative direction in the formation of the pulse shown in FIGURE 3, the positive potential is diminished an insufficient amount to cause rectifier 171 to conduct and hence no negative pulse is applied to junction point 47. Accordingly, this negative pulse has no effect upon the bi-stable circuit including the transistors 61 and 62. This results in the transistors 31 and 61 now being conductive and the transistors 32 and 62 now being nonconductive.

The drop in potential at the junction point 36 lowers the potential applied to the base of the transistor 170 sufficiently to diminish the conductivity of said transistor and this lowers the potential at the junction point 191 sufficiently to diminish the potential applied to the control electrodes of the control rectifiers 224 and 225 and thereby terminates their conductivity. This in effect increases the resistance between the points 226 and 227 in said phase shift circuit, thus terminating the output in the secondary winding of the transformer 203.

This terminates the "welding" sequence and initiates the "hold" sequence.

*Hold Time*

With the transistor 31 conductive the junction point 36 now remains at its low potential; with the transistor 32 nonconductive, the junction point 47 is at its high potential; with the transistor 61 conductive the junction point 66 is as its low potential, and with the transistor 62 nonconductive the junction point 77 is at its high potential. This continues to apply a high potential to the base of the transistor 181 which continues to hold the control rectifier 207 conductive and thereby continues to hold the relay 201 energized. With the relay 201 remaining energized, the electrodes of the welding machine will continue in their position for gripping the welding work. Since the welding current has been shut off, this now constitutes the hold time.

The line 113 is held at a low potential through the rectifier 119 to the junction point 66 and thence through the conductive transistor 61 to the common line 24. Thus, the line 113 is incapable of charging the timing capacitor 98. The line 124 is connected through the rectifier 128 to the junction point 36 and thence through the conductive transistor 31 to the common line 24. This holds the line 124 at a low potential and incapable of charging the timing capacitor 98. The line 155 is connected through the rectifier 120 and junction point 66 to and through the conductive transistor 61 to the common line 24 and hence said line 155 is held at a low potential so that it is incapable of charging the timing capacitor 98. However, the line 137 is connected only (1) through the rectifier 139 to the point 47 of high potential due to the nonconductivity of the transistor 32 and (2) to and through the rectifier 141 to the junction point 77 which will likewise be at a high potential due to the nonconductivity of the transistor 62. Therefore, the line 137 is capable of maintaining the high potential applied to it from the positive D.C. conductor 26 through the resistor 138 and it then acts through the rheostat 136 and rectifier 134 to charge the timing capacitor 98.

Within a time determined by suitable adjustment of the rheostat 136, said timing capacitor 98 reaches a point where it renders the uni-junction transistor 91 conductive and again creates a negative pulse at the junction point 94 in the same manner as above previously described and for the period of time required for the discharge of said capacitor 98. Again, as above described, the exact instant with respect to the A.C. supply potential appearing at the terminals 1 and 2 at which the triggering pulse appears at point 94 is determined by the diode 25 acting to render the transistor 15 conductive.

This negative pulse appearing at the junction point 94 is again applied to the junction points 36 and 47 and again effects a reversal of the conductivity of the transistors 31 and 32, the transistor 32 now becoming conductive and the transistor 31 now becoming nonconductive. The resultant sharp diminution of the potential at point 47 following the conductivity of the transistor 32, provides a negative pulse of adequately short rise time to pass the capacitor 251 and appear as above described at the junction points 66 and 77. This reverses the conductivity of the transistors 61 and 62 with the result that the transistor 62 is now conductive and the transistor 61 is now nonconductive.

This terminates the hold time sequence and commences what in a continuous operation would be the off time sequence. However, in a single operation sequence, the apparatus now returns to its "at rest" condition in the manner described following:

The line 113 is now connected to the rectifier 116 and the junction point 47 through the conductive transistor 32 to the line 24 and remains at a low potential insufficient to charge the capacitor 98. The line 124 is connected through the rectifier 132 and junction point 77 through the conductive transistor 62 to the common line 24 and is accordingly at a low potential and incapable of charging the timing capacitor 98. The line 137 is connected through the rectifier 141 to the junction point 77 and thence through the conductive capacitor 62 to the common line 24 and is likewise held at a low potential and incapable of charging the timing capacitor 98. The line 155 is now connected through the rectifier 149 to the junction point 36 which connects to the common line 24 only through the nonconductive transistor 31 and it similarly connects through the rectifier 120 to the junction point 66 which is connected to the common line 24 only through the nonconductive transistor 61. However, at the moment any tendency for raising the line 179 to a high potential is prevented by the connection of the point 152 through the line 210, rectifier 218 and contacts 209 to the common line 24. Nevertheless, this condition terminates immediately in the manner about to be described.

The dropping of the potential at both of the points 47 and 77 acts through the rectifiers 178 and 176 simultaneously to diminish the potential on the base of transistor 181 thereby terminating flow of current therethrough. This drops the potential at the point 184 and similarly drops the potential on the control electrode of the controlled rectifier 207, thereby rendering same nonconductive and thereby de-energizing the winding of the relay 201. This simultaneously opens the solenoid contacts "S" to release the welding electrodes and opens the contacts 209.

The opening of said contacts 209 will terminate the connection of the line 210 through the rectifier 218 to the common line 24 if the pilot 217 is open and thereby permit the junction point 152 again to rise to a level close to the voltage of the positive D.C. line 26. This permits the voltage on the line 155 to rise to a relatively high value and since the switch 146 bypasses the rheostat 144, the capacitor 98 will be charged immediately and will forthwith, usually within a single cycle, deliver a triggering pulse.

The triggering pulse delivered to the junction point 36 reverses the conductivity of the transistors 31 and 32 so that the transistor 31 is now conductive and the transistor 32 is now nonconductive. This effects a rise of potential at point 47. The triggering pulse will not reach point 47 because of the blocking effect of the bias on the cathode of rectifier 171 as previously mentioned in connection with the "weld time" sequence and hence there will be no pulse applied to the points 66 and 77 for reversing the transistors 61 and 62. Therefore, they will remain as previously, namely, with the transistor 61 nonconductive and the transistor 62 conductive.

This places the apparatus in the condition above described in more detail corresponding to the squeeze time. However, the squeeze time cycle does not operate for so long as the pilot switch is held open for the reason outlined below.

With the pilot switch open, the line 205 is no longer capable of holding the line 206 at the potential of the common line 24. Accordingly, the potential on said line 206 rises and is applied to the base of the transistor 255 to render same conductive. Conductivity of the transistor 265 acts at the junction point 140 (between the resistors 147 and 148) to lower same to a potential relatively close to that of the common line 24 and insufficient to apply sufficient potential to the line 113 to charge the capacitor 98.

Therefore, further cycling of the apparatus will be prevented, and both of the output loads (the winding 201 and the primary winding of the transformer 203) are de-energized. Accordingly, the apparatus is now returned to the "at rest" condition above described.

*Continuous Operation*

The foregoing description has assumed the apparatus to be in its "single operation" condition with the switches 146 and 146a in the position shown in the drawing. However, where a continuous operation is desired, said switches will be placed in their "R" position and a repeating operation with a suitably controlled "off time" will result.

Assuming said switches 146 and 146a to be in the "R" position, the apparatus is started in the manner above described and will operate as above described through the end of "hold time." This step will terminate by the negative pulse appearing on the junction point 94 in the manner above described which pulse will be applied to the two bi-stable circuits in the manner above described with the result that the transistors 32 and 62 will be rendered conductive and the transistors 31 and 61 will be rendered nonconductive. The point 152 is now disconnected at the switch 146a from the common line 24 so that the line 155 attains a high potential inasmuch as the connections of line 155 to the common line 24 are only through the rectifiers 149 and 120 and the nonconductive transistors 31 and 61.

Simultaneously, diminishing potential on the point 77 terminates flow through the transistor 181 and this in turn de-energizes the relay 201 in the manner above described so that the welding electrodes are released. The release of the welding electrodes in the manner above described constitutes the beginning of "off time."

The charging potential on the line 155 now causes current to flow through a rheostat 144 and charges the timing capacitor 98. When said capacitor becomes charged to a predetermined value, a negative pulse will again appear at the junction point 94 in the manner and for the reasons above set forth in connection with the preceding steps. Said negative pulse will be applied to the junction point 36 and will reverse the conductivity of the transistors 31 and 32 in the manner and for the reasons above set forth. Since the negative pulse does not reach point 47 because of the bias on the cathode of diode 171 mentioned above, no pulse will be applied to points 66 and 77 and hence no change will take place in the conductivity of the transistors 61 and 62.

A rise will, however, occur in the potential at the junction point 47 and this will act through the junction point 118, the rectifier 178 and the line 177 on the base of the transistor 181 and in the manner above set forth to resume energization on the relay 201, assuming that the pilot switch 217 is still closed.

This terminates the "off time" and initiates "squeeze time," thereby returning the apparatus to the "squeeze time" condition above described.

In this case, however, with the switch 217 continuing closed, the potential of the line 206 is held at the potential of the common line 24 and accordingly the base of the transistor 255 is held at a sufficiently low potential that said transistor is substantially nonconductive. This then permits the point 140 (between the resistances 147 and 148) to rise and potential is applied to the line 113 for effecting charging of the timing capacitor 98 in the manner above described and thereby effecting a continuation of the cycle.

Thus, with the sequence switches 146 and 146a in their "R" position, the cycle will repeat for so long as the pilot switch 217 is held in its closed position, and if said sequence switches are opened, the cycle will continue through the "off time" condition and then go into its "at rest" condition in the same manner as above described for a single operation.

The following chart will provide a summary of, and reference for, the condition of the various components of the circuit during the several parts of a "repeat operation" sequence. The pilot 217 is assumed to be closed during the whole sequence cycle.

In said chart the following symbols are used:

"C" refers to a transistor and means conductive,

"N" refers to a transistor and means nonconductive,

"High" refers to the D.C. voltage at a given point and indicates that such voltage is at or near the voltage supplied by the D.C. line 26, "Low" refers to the D.C. voltage at a given point and indicates that such voltage is at or near the voltage of common line 24,

| Component or junction point | At rest pilot switch open | Starting pilot switch closed | Squeeze | Weld | Hold | Off |
|---|---|---|---|---|---|---|
| 31 | C | C | C | N | C | N. |
| 32 | N | N | N | C | N | C. |
| 61 | N | N | N | C | C | N. |
| 62 | C | C | C | N | N | C. |
| 36 | low | low | low | high | low | high. |
| 47 | high | high | high | low | high | low. |
| 66 | high | high | high | low | low | high. |
| 77 | low | low | low | high | high | low. |
| 113 | low | high | high | low | low | low. |
| 124 | low | low | low | high | low | low. |
| 137 | low | low | low | low | high | low. |
| 140 | low | high | high | high | high | high. |
| 152 | high | high | high | high | high | high. |
| 155 | low | low | low | low | low | high. |
| 200 | high | low | low | low | low | low. |

If desired, and it will be found advantageous, a thermal-time delay device TD, or any similar delay timer, may be inserted between the resistor 189 and the junction point 191. This will protect the system from conduction of weld current in the event that the conductivity of the transistors should be that of the weld time condition when power is first applied. This will give the system time to cycle through to its "at rest" condition above described without applying welding current to the work, but by the time a normal welding sequence can occur, said thermal-time delay device will have closed its contacts and the system will operate in the manner already above described.

MODIFICATION

Figure 1A:
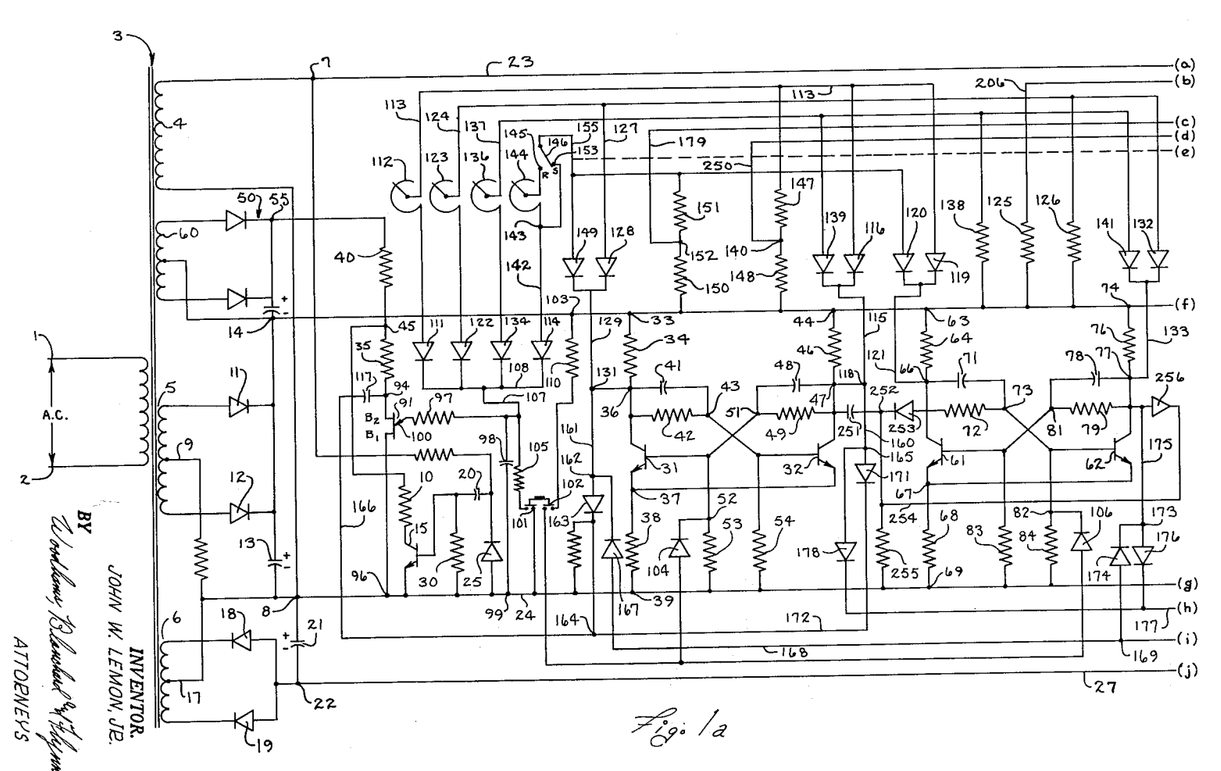
FIGURE 1a is a schematic diagram of a portion of a circuit embodying the invention.
Figure 1B:
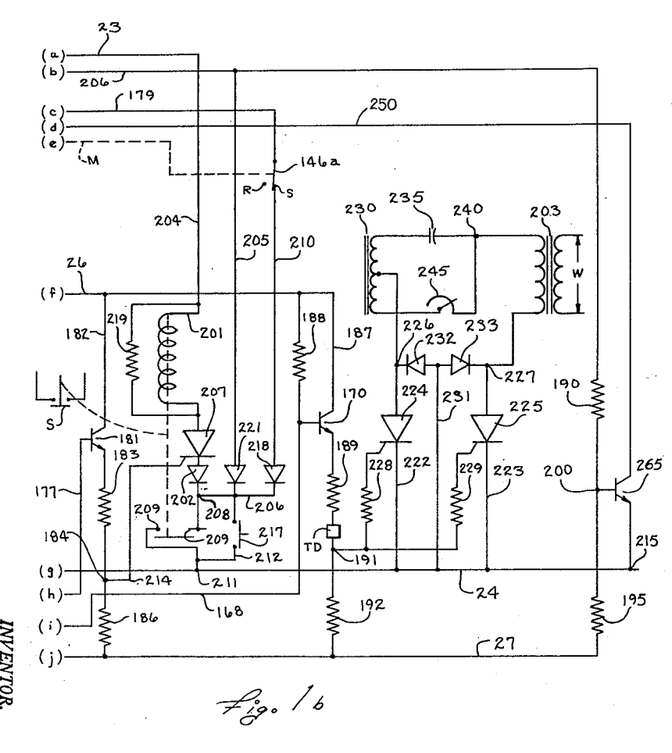
FIGURE 1b is a schematic diagram of the remainder of the circuit.
Figure 4:
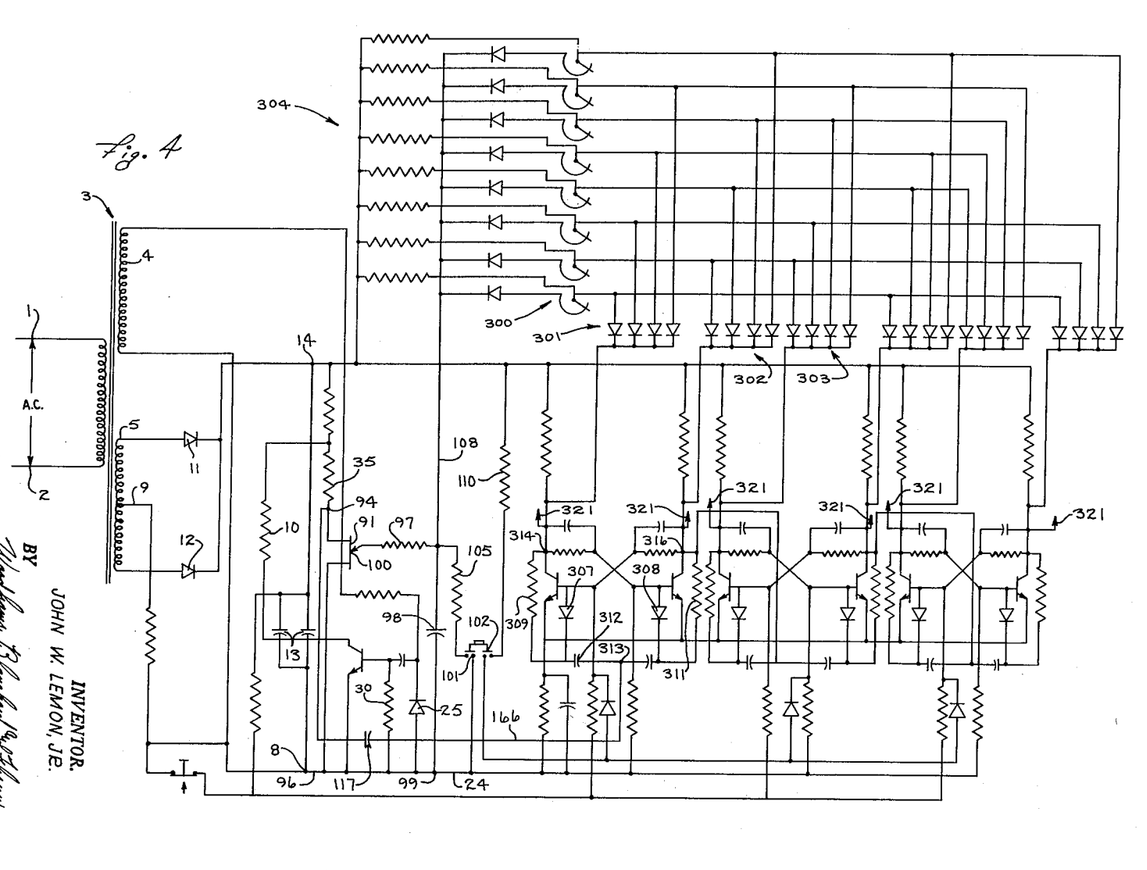

In FIGURE 4 there is illustrated a circuit generally similar to the circuit shown in FIGURES 1a and 1b arranged for providing larger numbers of functions than the four functions obtainable from the circuit of FIGURES 1a and 1b. In the circuit shown in FIGURE 4 there are eight functions obtainable.

The circuit of FIGURE 4 is generally similar to that of FIGURES 1a and 1b but with various parts thereof multiplied with respect to the corresponding parts shown in FIGURES 1a and 1b. For example, the rheostats indicated generally in FIGURE 4 at 300 correspond to the rheostats 112, 123, 136 and 144 in FIGURE 1a. The group of rectifiers indicated at 301 in FIGURE 4 correspond to the rectifiers 149 and 128 in FIGURE 1a. Rectifiers 302 of FIGURE 4 correspond to the rectifiers 139 and 116 of FIGURE 1a and the rectifiers 303 of FIGURE 4 correspond to the rectifiers 120 and 119 of FIGURE 1a. The resistances 304 of FIGURE 4 correspond to the resistances 151 and 147 of FIGURE 1a and the resistances 304 of FIGURE 4 correspond to the resistances 138 and 126 of FIGURE 1a.

FIGURE 4 also illustrates a further modification which can be utilized also in the circuit of FIGURES 1a and 1b in the arrangement of the several bi-stable circuits. In FIGURE 4, the rectifiers which appear at, for example, 163 and 171 are shown in FIGURE 4 at 307 and 308, respectively, and are connected to the bases of the respectively associated transistors. Resistances 309 and 311 and capacitors 312 and 313 are provided as shown serially between the point 313 (which corresponds to the point 164 of FIGURE 1a) and the point 314 (corresponding to the point 36 of FIGURE 1a) and the point 316 (corresponding to the point 47 of FIGURE 1a). This has an advantage of providing a more stable circuit and one which is somewhat less responsive to transients than is the circuit shown in FIGURE 1a. Output potentials may be taken in a manner similar to FIGURES 1a and 1b, such as at conductors 321.

The operation of the circuit of FIGURE 4 will be readily understood from the operation of the circuit of FIGURES 1a and 1b and accordingly no detailed description thereof is needed.

While a particular preferred embodiment of the invention has been disclosed in detail hereinabove, it will be recognized that the invention includes such variations or modifications thereof as lie within the scope of the invention as defined in the appended claims.

What is claimed is:

1. In a switching circuit, the combination comprising:
   a pair of source terminals connectible to a source of constant potential;
   a load;
   at least two bi-stable circuits connected in parallel relationship to each other between said source terminals;
   a plurality of junction points arranged respectively serially with each of said bi-stable circuits and which junction points are positioned between said bi-stable circuits and one side of said source, whereby the potential of said junction points varies from a relatively low to a relatively high value depending upon whether the portion of the bi-stable circuit with which said junction point is associated is conductive or non-conductive, respectively;
   connections from at least one of said junction points to said load for energizing and de-energizing same according to the potential on said junction point;
   an energy storage means and a plurality of charging circuits associated therewith, each of said charging circuits being associated with one of said junction points, whereby said charging circuits are energized according to whether said junction points are at a high or a low potential;
   a discharge circuit for said energy storage means;
   means responsive to activation of said discharge circuit for producing a triggering pulse; and
   means applying said pulse to at least one of said bi-stable circuits for effecting a reverse condition thereof.

2. In a switching circuit, the combination comprising:
   a pair of source terminals connectible to a source of constant potential;
   a load;
   a bi-stable circuit connected between said source terminals and including a pair of electric valves of which one is conductive and one non-conductive in each condition of said bi-stable circuit;
   a plurality of junction points each arranged respectively serially with one of said electric valves and which junction points are positioned between said electric valves and one side of said source, whereby the potential of said junction points varies from a relatively low to a relatively high value depending upon whether the valve with which said junction point is associated is conductive or nonconductive, respectively;
   connections from at least one of said junction points to said load for energizing and de-energizing same according to the potential on said junction point;
   an energy storage means and a plurality of charging circuits associated therewith, each of said charging circuits being associated with one of said junction points, whereby said charging circuits are energized according to whether said junction points are at a high or a low potential;
   a discharge circuit for said energy storage means;
   means responsive to activation of said discharge circuit for producing a triggering pulse; and
   means applying said pulse to said bi-stable circuits for effecting a reverse condition thereof.

3. In a switching circuit, the combination comprising:
   a pair of source terminals connectible to a source of constant potential;
   a load;
   at least two bi-stable circuits connected in parallel relationship to each other between said source terminals, each of said bi-stable circuits including a pair of electric valves of which one is conductive and one non-conductive in each condition of said bi-stable circuit;
   a plurality of junction points each arranged respectively serially with one of said electric valves and which junction points are positioned between said electric valves and one side of said source, whereby the potential of said junction points varies from a relatively low to a relatively high value depending upon whether the valve with which said junction point is associated is conductive or nonconductive, respectively;
   connections from at least one of said junction points to said load for energizing and de-energizing same according to the potential on said junction point;
   an energy storage means and a plurality of charging circuits associated therewith, each of said charging circuits being associated with one of said junction points, whereby said charging circuits are energized according to whether said junction points are at a high or a low potential;
   a discharge circuit for said energy storage means;
   means responsive to activation of said discharge circuit for producing a triggering pulse; and
   means applying said pulse to at least one of said bi-stable circuits for effecting a reverse condition thereof.

4. The circuit defined in claim 1 wherein at least two of said junction points are connected to said load.

5. The circuit defined in claim 1 wherein said pulse producing and said pulse applying means include:
  means providing a normally open circuit connecting said source terminals;
  a triggering circuit junction point between one source terminal and the point at which said circuit is open, and means closing said circuit upon attainment by said energy storage means of a charge of a predetermined value;
  a conductor connected to said last-named junction point and effective for applying a triggering pulse to at least one of said bi-stable circuits upon the appearance of a pulse at said trigger circuit junction point.

6. The circuit defined in claim 5 wherein said trigger circuit junction point is directly connected to only a first of said bi-stable circuits and the second of said bi-stable circuits is triggered from a point on the high potential side of one of the portions of said first bi-stable circuit;
  whereby said first bi-stable circuit will reverse its condition upon each appearance of a pulse at said trigger junction point and the second bi-stable circuit will reverse its condition only upon alternate reversals of the condition of said first bi-stable circuit.

7. The circuit defined in claim 3 wherein said charging circuits constitute a plurality of conductors connected in parallel between said energy storage means and one side of said source, and each of said conductors is connected to the one side of a rectifier, the other side thereof being connected to one of said junction points whereby those charging conductors which are connected to a valve which is conductive in a given instance will remain at the potential of the other side of said source and a conductor which is connected only to a nonconductive valve will remain at the potential applied thereto by the said one side of said source;
  a timing rheostat in each of said charging conductors;
  whereby the one of said charging conductors which is energized in a given instance is selected according to which of said valves is conductive in such instance and the time for charging the said timing capacitor is determined by the setting of the rheostat in that one of said charging conductors which is energized in a given instance.

8. In a switching circuit the combination comprising:
  a pair of source terminals connectible to a source of constant potential;
  a load;
  at least two bi-stable circuits connected in parallel relationship to each other between said source terminals;
  each of said bi-stable circuits including a pair of electric valves of which one is conductive and one nonconductive in each condition of said bi-stable circuit;
  a plurality of junction points each arranged respectively serially with one of said electrical valves and which junction points are positioned between said electric valves and the positive side of said source, whereby the potential of said junction points varies from a relatively high value to a relatively low value depending upon whether the valve with which said junction point is associated is conductive or nonconductive;
  connections from at least one of said junction points to said load and arranged for energizing and de-energizing same according to the potential of said junction point;
  pulse producing means and a plurality of time controllable, energizing circuits associated therewith, each of said last-named energizing circuits being related to one of said junction points in such a manner that said energizing circuits are energized according to whether a given junction point is at a high or a low potential whereby said pulses will be produced in timed relationship to the appearance in one of said energizing circuits of an energizing potential;
  and means applying a pulse produced by said pulse producing means to at least one of said bi-stable circuits for effecting a change in condition thereof, whereby the condition of energization of said load is responsive to and in timed relationship with the level of potential at said junction points.

9. In a switching circuit the combination comprising:
  a pair of source terminals connectible to a source of constant potential;
  a load;
  at least two bi-stable circuits connected in parallel relationship to each other between said source terminals;
  each of said bi-stable circuits including a pair of electric valves of which one is conductive and one is nonconductive in each condition of said bi-stable circuit;
  a plurality of junction points each arranged respectively serially with one of said electrical valves and which junction points are positioned between said bi-stable circuits and the one side of said source, whereby the potential of said junction points varies from a relatively high value to a relatively low value depending upon whether the valve with which said junction point is associated is conductive or nonconductive;
  connections from at least one of said junction points to said load and arranged for energizing and de-energizing same according to the potential of said junction point;
  pulse producing means and a plurality of time controllable, energizing circuits associated therewith, each of said last-named energizing circuits being related to one of said junction points in such a manner that said energizing circuits are energized according to whether a given junction point is at a high or a low potential whereby said pulses will be produced in timed relationship to the appearance in one of said energizing circuits of an energizing potential;
  and means applying a pulse produced by said pulse producing means to at least one of said bi-stable circuits for effecting a change in condition thereof, whereby the condition of energization of said load is responsive to and in timed relationship with the level of potential at said junction points.

10. In a switching circuit the combination comprising:
  a pair of source terminals connectible to a source of constant potential;
  a load;
  a first bi-stable circuit including a pair of electric valves, the positive terminal of a first thereof being connected through a first junction point to the positive side of said source, the negative terminal thereof being connected to the negative side of said source, the positive side of the second of said valves being connected through a second junction point to the positive side of said source and the negative side thereof being connected to the negative side of said source, said first junction point being connected to the control electrode of said second valve and said second junction point being connected to the control electrode of said first valve;
  a second bi-stable circuit including third and fourth electric valves, said third electric valve being connected through a third junction point to the positive side of said source and the negative side thereof being connected to the negative side of said source and said fourth electric valve having its positive side connected through a fourth junction point to the positive side of said source and its negative electrode being connected to the negative side of said source, said third junction point being connected to the control electrode of said fourth valve and said fourth junction point being connected to the control electrode of said third valve;
  a pair of rectifiers and means connecting the anodes of said rectifiers respectively to said third and fourth junction points and the cathodes thereof to said second junction point;
  a timing capacitor and a plurality of separately timable charging circuits connected therewith and means effecting one-at-a-time successive energization of said charging circuits;

a discharging circuit for said timing capacitor and means closing said circuit in timed relationship to the commencement of energization of a given one of said charging circuits;

means activated by energization of said discharging circuit for producing a triggering pulse and means applying said triggering pulse to said first and second junction points;

whereby said triggering pulse is produced in timed relationship to the energization of one of said charging circuits, a pulse for shifting the condition of energization of said first bi-stable circuit is produced with each energization of said discharging circuit and the lowering of potential at the second junction point occurring as a result of said shift in one direction of the condition of energization of said first bi-stable circuit will produce a pulse which applied to and capable of shifting the condition of energization of said second bi-stable circuit;

and means responsive to the potential level of one of said junction points for affecting the condition of energization of said load.

11. The device defined in claim 10 wherein said load includes an electric valve and said last-named means is connected to the control electrode of said valve.

12. The device defined in claim 10 wherein the charging circuits are each related to said junction points in such a manner that the potential level of said junction points determines which of said charging circuits is energized.

References Cited in the file of this patent

UNITED STATES PATENTS

| | | |
|---|---|---|
| 2,370,178 | Livingston | Feb. 27, 1945 |
| 2,492,015 | Stadum et al. | Dec. 20, 1949 |
| 3,031,622 | Kirchner et al. | Apr. 24, 1962 |

UNITED STATES PATENT OFFICE
CERTIFICATE OF CORRECTION

Patent No. 3,129,344                             April 14, 1964

John W. Lemon, Jr.

It is hereby certified that error appears in the above numbered patent requiring correction and that the said Letters Patent should read as corrected below.

Column 1, line 15, after "utilized" insert -- for controlling resistance welding operations, it will be recognized --; column 2, line 33, for "RESCRIPTION" read -- DESCRIPTION --.

Signed and sealed this 22nd day of September 1964.

(SEAL)
Attest:

ERNEST W. SWIDER                          EDWARD J. BRENNER
Attesting Officer                              Commissioner of Patents